UNITED STATES PATENT OFFICE.

GEORGE E. SEELY, OF REDWOOD CITY, CALIFORNIA.

PROCESS OF MAKING A PUNCTURE-SEALING COMPOSITION.

1,117,526.  Specification of Letters Patent.  Patented Nov. 17, 1914.

No Drawing.  Application filed September 30, 1913. Serial No. 792,600.

*To all whom it may concern:*

Be it known that I, GEORGE E. SEELY, a citizen of the United States, residing at Redwood City, in the county of San Mateo and State of California, have invented new and useful Improvements in Processes of Making a Puncture-Sealing Composition, of which the following is a specification.

This invention relates to a composition of matter for coating the interiors of inflatable tires to render them puncture-proof and also pertains to the method of manufacturing same.

It is the object of this invention to provide a composition of the above character which is inexpensive, both as to its constituents and manufacture, which is positive in its action of sealing punctures, and readily applied.

Another object is to provide a sealing composition which is normally in a light liquid state so that it can be introduced into a tire through the valve stem, and which is light in weight and requires but a small quantity in its application so as not to add perceptible weight to the tire.

A further object is to provide a liquid sealing composition which is lasting and will not deteriorate when confined in a tire away from contact with fresh air; which is not affected by extreme climatic conditions, either as to heat or cold, and which composition is not detrimental to rubber, but adds to its life and increases its durability.

The main constituent or base of the composition comprising this invention is a vegetable substance known as gambier, or gambia, also called "cutch" and "terra Japonica", and is commercially considered as one form of catechu. It possesses astringent properties and contains tannic acid or tannin, which renders it particularly valuable for use in its present application. This substance, as obtained on the market, is a thick, pasty mass, containing approximately 60% solids, which slowly hardens on exposure to air, and when moisture is removed therefrom, but is readily soluble in water and other liquids.

In the preparation of my new composition, claret wine is employed as a solvent for the gambier on account of its property of slow evaporation and because it freezes only at extraordinary low temperature, and also on account of its density or body. It has been found that these two ingredients when mixed in about the proportions of 8 ounces of gambia to 10 ounces of wine, and boiled to reduce to 15 ounces, answers very well without addition of other substances, but the quality of the composition is greatly increased by the addition of a small quantity of glucose, of commercial density, to further lessen the tendency of evaporation in mass. By further adding a small quantity of pulverized asbestos, which is insoluble and gives a fibrous or granular character to the composition, and adding some quebracho to toughen the film of the mixture, its efficiency as a seal for punctures is increased, as will become apparent hereinafter.

In the manufacture of the composition the following proportions and steps to produce 16 ounces of solution is preferably employed: 8 ounces of gambier is dissolved in 10 ounces of claret wine, to which solution 2 ounces of glucose is added, giving a volume of 20 ounces. This mixture is then boiled down to 15 ounces, and approximately 4 ounces of pulverized asbestos and 2 ounces of dry quebracho are added while hot, and the whole allowed to cool to normal temperature when it is ready for use. The solution thus obtained is in a thin fluid state and can be readily introduced into a tire through the valve stem, and will remain in this condition as long as confined in the dead air of the tire so as to thoroughly coat the inner surface of the tire when it is rotated.

It has been found in practice that only such quantity of the composition need be placed in the tire as is necessary to coat its inner surface, which quantity amounts to about 3 ounces in an ordinary tire. The quantity used may be increased however, as the compound does not thicken and form accumulations or deposits in the tire, neither does it freeze when subjected to extreme cold.

The solution will not readily thicken in the atmosphere in mass, but when a thin film is exposed to fresh air it will quickly thicken and harden, hence its utility in sealing punctures in tires, wherein a small portion of the liquid will enter a puncture from the inside of the tire, and by reason of being spread in a thin film will quickly harden and thereby effectively prevent the escape of air from the tire.

While in some instances the asbestos may be dispensed with, it is nevertheless an important ingredient, in that it serves as a gritty or granular filler, and acts to clog a perforation in the rubber and thereby quickens the closing and sealing of the puncture.

An important feature of the compound resides in its vegetable nature, its acidity and its fluid character, which renders it harmless to rubber, and prevents it from drying out, by supplying moisture thereto.

Experiment has demonstrated that the above substances, when mixed in the manner and proportions set forth, accomplish the desired result, but it is manifest that the proportions may be varied and the order of steps of manufacture may be changed without altering the nature of the compound or departing from the spirit of the invention.

Having thus described my invention, what I claim and desire to secure by Letters Patent is—

The herein described method of making a puncture sealing composition which consists in dissolving gambier in claret wine, and adding glucose thereto, then in boiling the mass and while hot adding pulverized asbestos and dry quebracho, and finally in cooling the mass.

In testimony whereof I have hereunto set my hand in the presence of two subscribing witnesses.

GEORGE E. SEELY.

Witnesses:
ALPHONSUS S. LIGUORI,
MARY E. READ.